Figure 5:
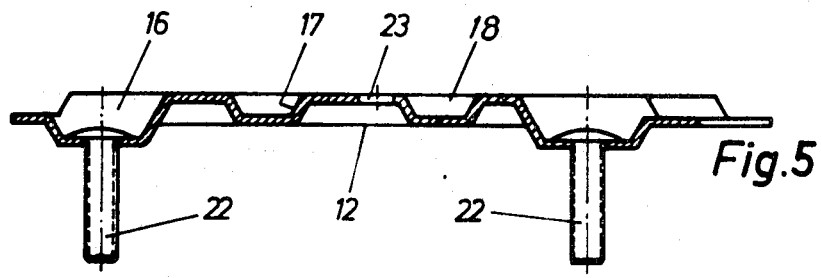

United States Patent

[11] 3,604,748

| [72] | Inventor | Klaus Lamkemeyer<br>70 Huelsbrockstrasse, 4830 Guitersloh,<br>Westphalia, Germany |
|---|---|---|
| [21] | Appl. No. | 817,897 |
| [22] | Filed | Apr. 21, 1969 |
| [45] | Patented | Sept. 14, 1971 |

[54] BICYCLE SADDLE
9 Claims, 16 Drawing Figs.

[52] U.S. Cl. ................................................ 297/214,
297/DIG. 1
[51] Int. Cl. ................................................ B62j 1/18
[50] Field of Search ................................... 297/214,
455, 456, 452; 5/361 B

[56] References Cited
UNITED STATES PATENTS

| 562,965 | 6/1896 | Lester | 297/214 |
| 651,628 | 6/1900 | Johnston | 297/195 |
| 1,479,620 | 1/1924 | Mesinger | 297/214 |
| 3,175,863 | 3/1965 | Hood | 297/455 |
| 3,389,935 | 6/1968 | Getz et al. | 297/452 |

FOREIGN PATENTS

| 407,436 | 3/1934 | Great Britain | 297/195 |

*Primary Examiner*—James C. Mitchell
*Attorney*—Polachek & Saulsbury

ABSTRACT: A bicycle saddle comprising a rigid supporting body, a foamed cushion body formed thereon, and a cover skin over said cushion body, wherein said cushion body consists of an open-pore foam body merging by way of a zone of pores of reduced size into said external homogeneous cover skin, said cushion body being connected inseparably to said supporting body during the course of manufacture in the foaming process.

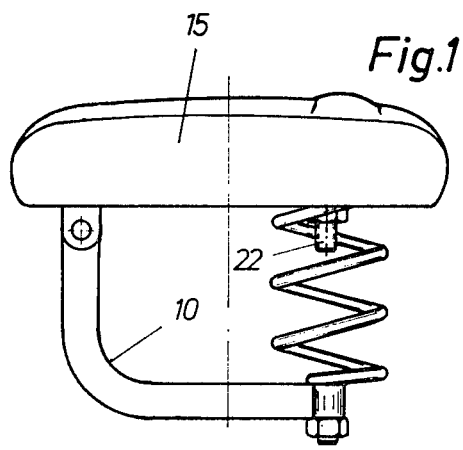
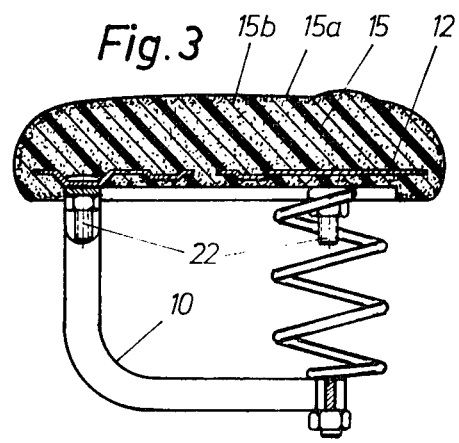
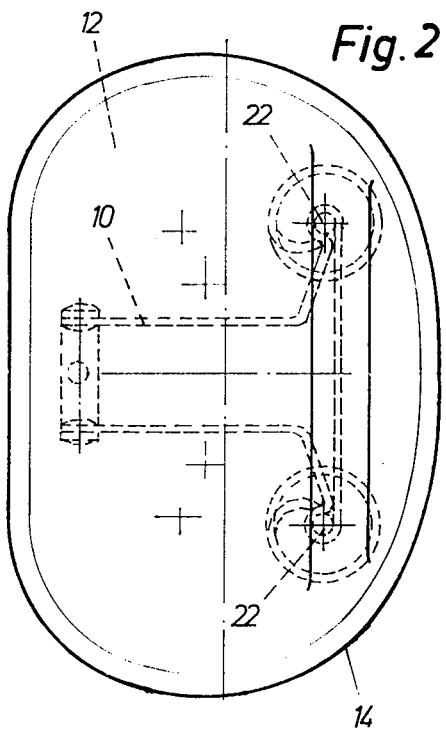
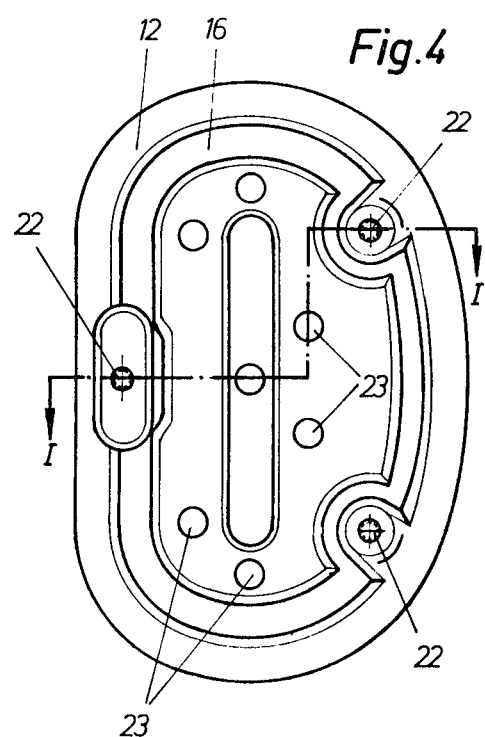

Inventor:
Klaus Lamkemeyer

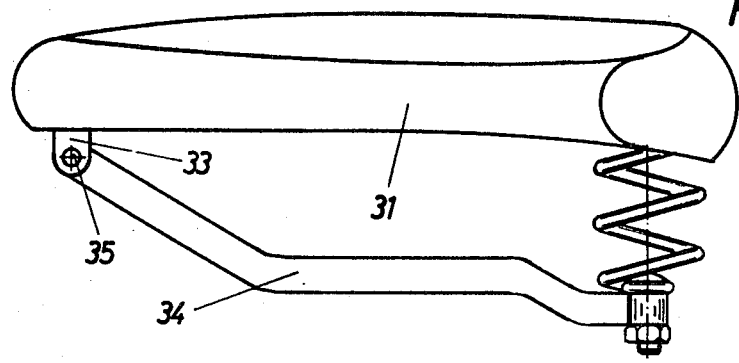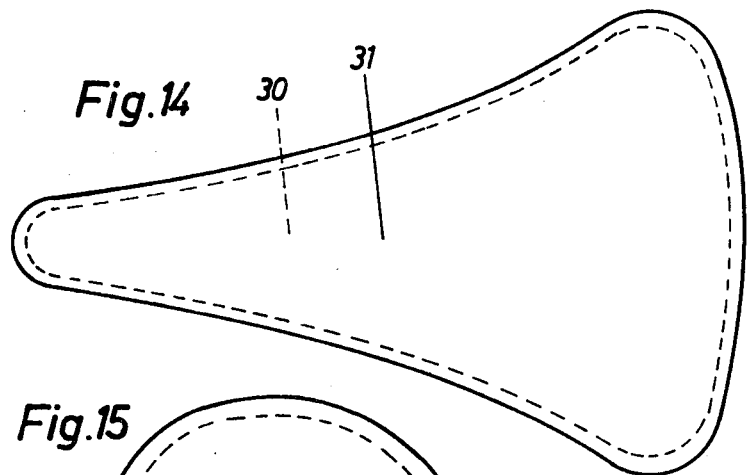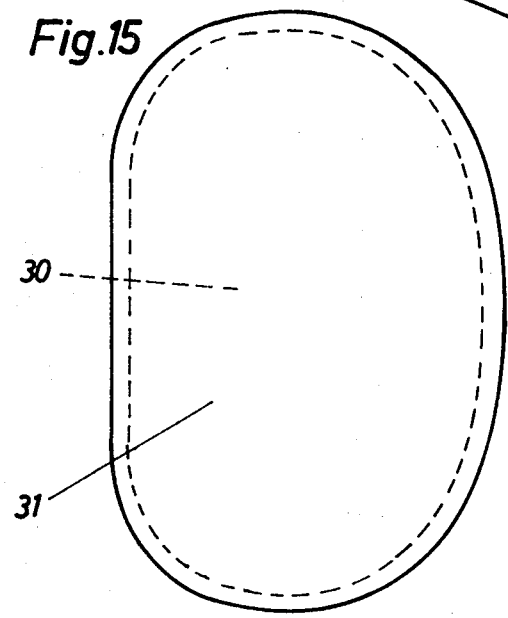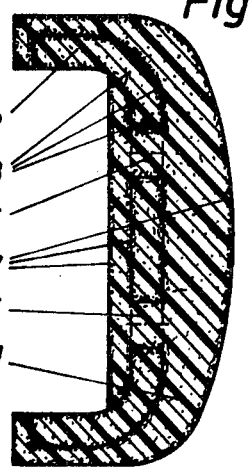

BICYCLE SADDLE

The present invention concerns a bicycle saddle comprising a rigid supporting body and a cushion foamed body thereon, with a cover layer or surface skin.

Several embodiments of such bicycle saddles are already known. However, they have the great disadvantage that they are complicated and expensive to manufacture on account of the large number of individual parts and operations.

It is an object of the present invention to produce an improved, simply and economically manufactured bicycle saddle incorporating a cushion.

A further object of the present invention is to improve the supporting body from the manufacturing point of view, while the supporting body is also made lighter in weight and retains good strength characteristics.

In accordance with the present invention a bicycle saddle or the like, comprising a rigid supporting body and a cushion foamed thereon with a cover skin is characterized in that the body of the cushion consists of an open-pore body of foam material merging through a zone of smaller cavities into a closed-pore external cover skin formed of uniform (homogeneous) material and is inseparably connected to the supporting body in the course of manufacture during the foaming process.

In a preferred embodiment the body of the cushion is rigidly connected to the supporting body over the entire connecting area by means of a compressed layer.

In accordance with another embodiment the supporting body consists of hard foam; it forms one unit with securing members and is at least partially enclosed by a cushioning body consisting of soft foam.

Other preferred features of the invention will be apparent from the following description.

A bicycle saddle made according to the present invention with good suspension properties of the saddle cushion, has a simple, durable and economic construction. The manufacture thereof is economical, since the manual work is greatly simplified compared with conventional saddles. It is a particular advantage that the entire saddle consisting of the supporting body (hard foam) and the cushion body (soft foam) can be manufactured in two operations without manual labor and is provided at the same time with the securing members which form a unit with the supporting body.

Due to the supporting body of hard foam, no metal-supporting plate is necessary and a considerable saving in weight is achieved, with a reduction in the cost of materials. The supporting body consisting of hard foam has great stability, so that even when the connecting and securing members are subjected to strain, no damage occurs to the securing members. However, due to the light but very stable construction of the saddle, the saddle is suitable for any possible kind of use.

The application of such a saddle is not limited to bicycles, mopeds or the like, but applies also to forms of saddle construction known today as bicycle seat cushions.

It is a great advantage that, despite good seat properties due to its rigid connection, the usual so-called floating of the mass of the cushion on its support cannot take place—the supporting plate is secured to the body of the cushion by means of the compressed foam layer. Another advantage is that a separate outer layer is not required, but is formed by the same correspondingly compressed synthetic foam.

Figure 6:
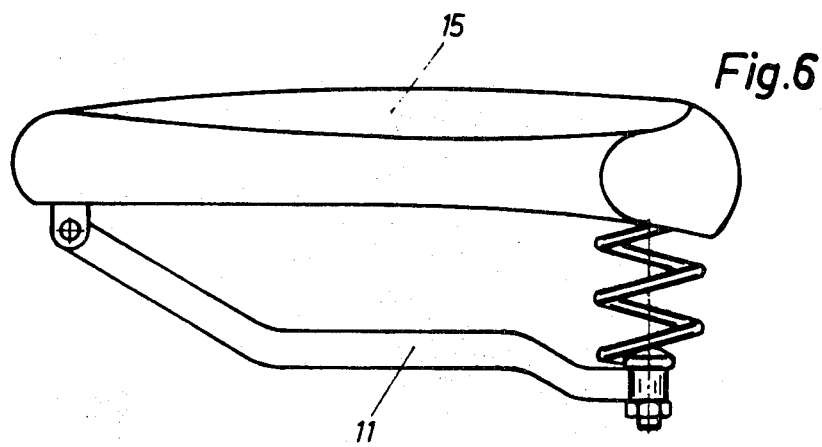
Figure 7:
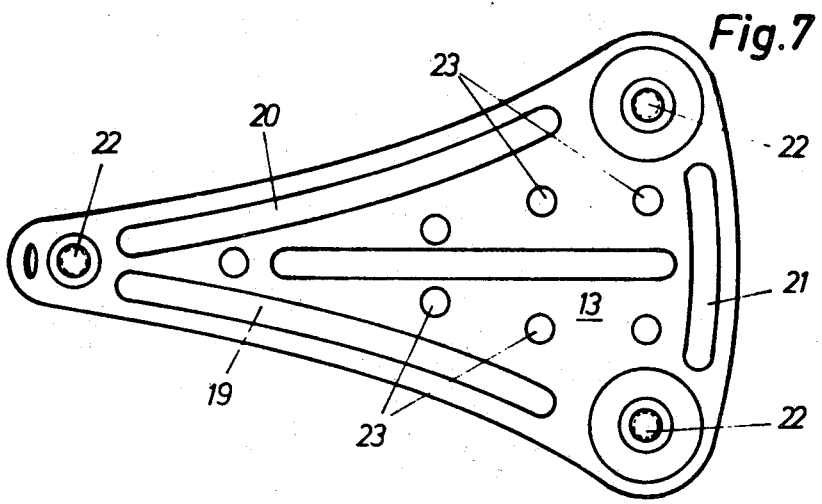
Figure 8:
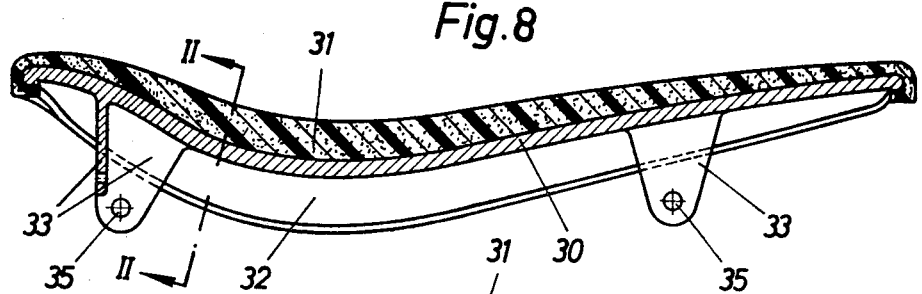
Figure 9:
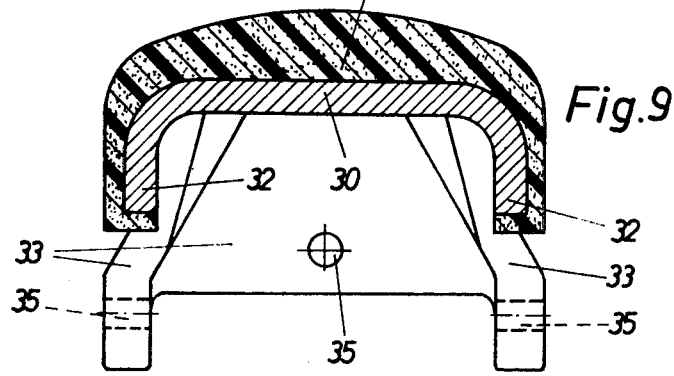
Figure 10:
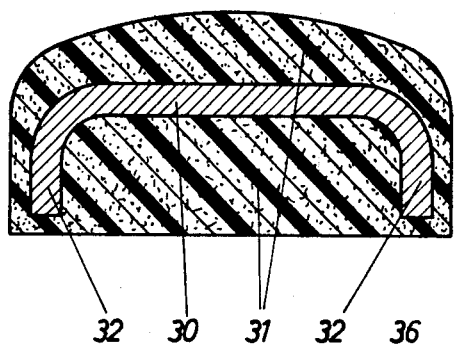
Figure 11:
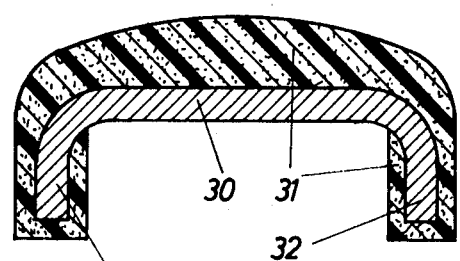
Figure 12:
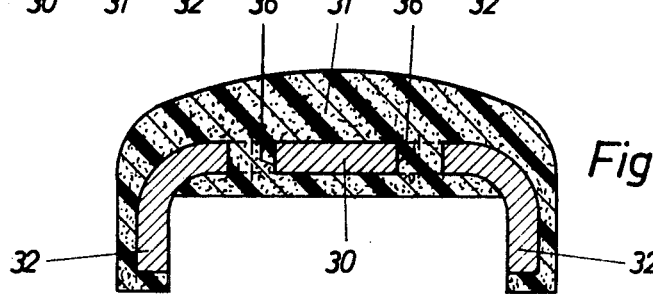

The present invention will be described hereinafter with reference to embodiments illustrated in the accompanying drawings in which:

FIG. 1 is a side view of a bicycle saddle constructed as a lady's saddle, comprising a supporting plate and cushion foamed thereon, with cover skin, FIG. 2 is a view of the same lady's saddle from below, FIG. 3 is a section taken through the same lady's saddle in which the cushion mass and cover skin are formed in one piece, FIG. 4 is a plan view of the supporting plate of a lady's saddle, FIG. 5 is a section taken through the same supporting plate on the line I—I of FIG. 4, FIG. 6 is a side view of a man's bicycle saddle, FIG. 7 is a plan view of the supporting plate of the saddle of FIG. 6., FIG. 8 is a longitudinal section through a modified saddle, comprising a cushion body foamed on a supporting body, FIG. 9 is a cross section through a saddle taken on the line II—II if FIG. 8, having securing members provided on the supporting body and forming one piece therewith, FIG. 10 is a cross section through the same saddle, comprising a cushion body completely enclosing the supporting body, FIG. 11 is a cross section through the same saddle comprising a cushion body party enclosing the supporting body, FIG. 12 is a cross section through the same saddle comprising a cushion body engaging through apertures in the supporting body, FIG. 13 is a side view of a saddle of modified form, FIG. 14 is a plan view of the saddle according to FIG. 13, FIG. 15 is a plan view of a saddle of another modified form, FIG. 16 is a cross section through the same saddle comprising layers of the supporting and cushion body compressed on the outer sides and the connecting surface sides.

A bicycle saddle may be manufactured as a lady's or gentleman's saddle or a child's saddle, and constructed with any desired shape of seating surface—both without and with a saddle point terminating at the front in a noselike projection (see FIG. 2 and 6). The saddle provided for cycles, mopeds, children's cycles (children's toys) and the like, has a rigid supporting plate (baseplate) 12 and 13 detachably provided on a saddle frame 10 and 11, preferably provided with at least one spring device and preferably manufactured of metal, on which plate a saddle cushion 14, 15, consisting of plastics material or rubber, is foamed.

The supporting plate 12, 13 of the saddle of the present invention is preferably constructed in one part; it extends below the seating surface practically to the side edge of the saddle and is provided, for stabilizing purposes, with reinforcing beads 16, 17 or 18, 19, 20, 21. To secure it to the saddle frame 10 and 11, the supporting plate 12, 13 has on its lower side three securing threads, in particular threaded pins 22 formed as headed screws, the heads of which are arranged in beadlike troughs located opposite to the reinforcing beads, and are secured by welding or the like. So that the foam saddle cushion 14, 15 may have an improved connection with the supporting plate 12, 13, the plate 12, 13 is provided with several apertures 23 through which the foam can penetrate in the course of manufacture and can set on both sides of the plate.

The foaming of the saddle cushion 14, 15 is effected in the course of manufacture in a mould which simultaneously determines the shape of the saddle and is heatable according to the requirements of manufacture before or after the foaming and movement into a heating chamber, in which mould the supporting plate 12, 13, provided with threaded pins 22, is received and secured in position.

The saddle cushion 14, 15 is manufactured substantially as an open-pore foam part.

In the construction shown in FIGS. 1-5 the saddle cushion 15 is formed of a foam material set under the action of heat into a closed-pore material, more particularly soft synthetic foam as integral foam on a base of polyurethane. The foam structure of this saddle cushion 15 merges in the marginal areas of the cushion into a closed-pore cover skin 15b by way of a zone 15a of reduced size cavities; in this case therefore, the cushion mass and cover skin are formed in the course of manufacture in an economical manner as a single piece consisting of the same material. A special advantage of this formation is not only simple manufacture but also the permanently durable construction and connection of the cushioning material and the outer cover layer.

FIGS. 5-7 show the details of the same (FIG. 5) or modified saddle construction.

In the construction according to FIG. 8 et seq a saddle has a rigid supporting body 30 and a cushion body 31 foamed thereon. The supporting body 30 consists of hard foam and is provided, on the lower side, with securing members 33 forming one piece with the supporting body 30 and foamed on the supporting body 30 in the course of manufacture.

The cushion body 31 is made of soft foam and encloses at least partly the supporting body 30 carrying it.

The supporting body 30 is preferably formed as a hood (see FIGS. 8-12) or a plate. The supporting body 30 made in the form of a hood has, extending round the edges, a turned down edge 32 which in turn assist the stability of the supporting body 30 and serves to enclose the cushion body 31 (see FIGS. 8-12).

It may also be preferable to provide the supporting body 30, made of hard foam, with reinforcing ribs and/or beads (not shown) which are integral with the supporting body 30 or are removed therefrom during manufacture and provided at least on one side, preferably on the lower side; due to the reinforcing ribs and/or beads the stability of the supporting body 10 is further increased. In addition metal reinforcing parts (not shown) may be incorporated therein for reinforcing the supporting body.

Crosspieces, butt straps or other supports may be provided as securing members 33 and are manufactured in one piece with the supporting body 30 of the same material (hard foam).

The supporting body 30 may be provided with pairs of downwardly extending supporting members as shown in FIGS. 8 and 9, in the front area of the saddle (noselike projection area) and in the rear area, which members are provided for mounting a saddle bridge 34 or a saddle frame. Another securing member 33, such as a crosspiece, may be provided between the two rear supporting members on which member 33 a saddle bag or a rear reflector may be provided. The securing members 33 are provided with receiving apertures 35 such as holes or the like formed during the manufacture of the supporting body 30; alternatively these receiving apertures 35 may be formed after the manufacture of the supporting body.

In the region of the receiving apertures 35 of of securing members 33 teeth (not shown) may connection provided which are incorporated during the foaming of the supporting body. These teeth in the area of the receiving apertures render possible an adjustable connection in the securing of the saddle bridge 34 or of other kinds of supporting or utility articles so that the parts to be connected can be reliably adjusted with respect to one another.

Furthermore, metal reinforcing parts such as discs can be incorporated in the supporting body 30 in the area of the receiving apertures 35 in the securing members 33 for reinforcing the contact surfaces of said securing members.

It is also preferable to provide securing threads, such as threaded pins, female screws or the like as securing members in the supporting body 30 in the course of its manufacture; the supporting body 30 consisting of hard foam may be provided with securing members 33 and/or securing threads and form one unit therewith.

The supporting body 30 of hand foam and the cushion body 31 of soft foam are provided with a closed-pore or open-pore outer covering respectively; this outer covering consists of a closed-pore or poreless cover skin produced by the action of heat during manufacture, formed of the same material and merging through a zone of smaller cavities. It is preferable to use a two-component foam as hard foam and soft foam respectively.

The cushion body 31 at least partly encloses the supporting body 30 in that it is formed round the supporting body 30 like a hood; the cushion body 31 extends with its marginal areas encircling the outer and underside of the supporting body—edges 32 (see FIGS. 8 and 9) or encircling the outer, lower and inner side of the supporting body edges 32 (see FIG. 11).

The cushion body 31 may completely enclose the supporting body 30 so that the supporting body 30 is embedded in the cushion body 31 (see FIG. 10). In the embedded supporting body arrangement the securing members 33 project out of the cushion body 31 at least on the lower side.

It is preferable to provide the supporting body 30 with apertures 36, such as holes or the like so that a soft foam arrangement is possible on two sides (see FIG. 12), the cushion body 31 penetrating through the apertures 36 and lying over the surface of the supporting body on the underside or extending like rivet heads in the region of the apertures 36 on the underside of the supporting body 30. The soft foam arrangement on both sides achieved through the apertures 36 ensures a reliable connection of the cushion body with the supporting body 30 and thus increases the strength of connection of both bodies 30, 31.

The supporting body 30 is preferably manufactured by the injection moulding process in a mould corresponding to the desired shape of saddle, in which the hard foam for forming the supporting body 30 is injected. After the manufacture of the supporting body it is placed in a second mould and the soft foam for forming the cushion body 31 is injected and foamed onto the supporting body 30; both bodies 30, 31 are firmly connected together by the foaming process.

The saddle bridge 34 may be manufactured of hard foam-like the supporting body 30.

As shown in FIG. 16, each cushion body 31 consisting of soft foam is provided on the outside and over the entire connecting area (surface of the supporting body) and apertures 36 with the supporting body 30 with a closed-pore or poreless layer 37 formed of the same material (soft foam) by way of a zone of smaller cavities, which layer has a high internal strength and permanently connects the cushion body 31 to the supporting body 30. This layer 37 which is made stronger and harder than the soft foam, extends as a cover skin (outer skin) and connecting layer completely enclosing the cushion body 31 and is necessarily produced during the complete foaming process thereof; this layer 37 is also present in the region of perforation 36 in the supporting body 30 so that this layer 37 is formed throughout the entire connecting area of the cushion body 31 with the supporting body 30 and on the outside of the cushion body 31. Due to this layer 37 the position of both bodies 30, 31 relatively to each other is fixed, and a floating position of the supporting body 30 in the cushion body 31 is prevented, this layer 37 ensuring a good cushioning effect with good strength. The cushion body 31 is connected to the supporting body 30 in the region of this layer 37 in the course of manufacture.

Each supporting body 30 of hard foam is provided externally on all sides with a closed-pore or poreless layer 38 formed of the same material, by way of a zone of smaller cavities so that both bodies 30, 31 are provided with layers 37, 38 compressed at the edges and connected together without adhesive in the region of these layers. These layers 37, 38 give the bodies 30, 31 good stability, long life good resilient properties, and a reliable connection.

The shape and size of the saddle formed in two operations of a supporting body 30 of hard foam and the cushion body 31 of soft foam may be obtained in different ways.

For example, the saddle may be formed as a polo saddle (see FIG. 8) or as a man's or child's saddle (see FIGS. 13 and 14) or as a hady's saddle (see FIG. 15). In addition, this saddle may be used both for bicycles and for multiwheel cycles.

As synthetic foam for the cushion a soft foam sn a base of polyurethane (so-called integral foam) is preferably used in all constructions according to the present invention.

We claim:

1. A bicycle saddle comprising a rigid supporting body, a foamed cushion body formed thereon, and an external homogeneous cover skin over said cushion merging with cushion body by a substantially continuous zone of pores of progressively reduced size in the direction of said skin with said skin thereby being inseparably connected to said foamed cushion body, and said cushion body being connected inseparably to said supporting body by a connecting means including said foamed cushion body being formed in a shape at least partially surrounding said supporting body, said supporting body consisting of hard foam.

2. The bicycle saddle as recited in claim 1, wherein said supporting body is provided with stabilizing beads to form an enlarged connecting surface for said foam material.

3. The bicycle saddle as recited in claim 2, comprising a metal plate as said supporting body, and threaded fixing bolts rigidly secured to said metal plate in the region of said beads.

4. The bicycle saddle of claim 1, wherein the supporting body of hard foam is provided with reinforcing ribs.

5. The bicycle saddle of claim 1, further comprising riblike reinforcing members provided on the lower side of said supporting body, said securing members being integral with said supporting body and made of the same material.

6. The bicycle saddle of claim 1, wherein said supporting body defines apertures, there being a layer of soft foam on both sides of said supporting body, and interconnections between said soft foam layers through said apertures.

7. The bicycle saddle of claim 5, wherein said securing members extend out of said cushion body on the underside thereof, and are provided with receiving apertures.

8. A bicycle saddle comprising a supporting body of hard foam, a padding member of soft foam formed on said supporting body, rib-shaped edges formed on said supporting body and being bent over to form an enlarged connecting surface for said soft foam material, fastening members provided on the underside of said supporting body to a saddle frame or a saddle bridge, receiving apertures provided in said fastening members, said soft foam padding member embracing the seat surface and the lateral edges of said hard foam supporting member like a hood and enclosing at least the lower edge of the rim of said supporting body on the underside of the saddle, a cover skin over said soft foam padding member, wherein said padding member consists of an open-pore foam body merging by way of a zone of pores of reduced size into said cover skin.

9. A bicycle saddle comprising a supporting body of hard foam, a padding member of soft foam formed on said supporting body, passages for said soft foam material provided in said supporting body, rib-shaped edges formed on the lateral edges of said supporting body and being bent over downwards to stabilize the supporting body and form an enlarged connecting surface for said soft foam material, fastening members provided on the underside of said supporting body between the lateral edges thereof and projecting downwards for fastening to a saddle frame or saddle bridge, receiving apertures being provided in said fastening members, said receiving apertures extending at right angles to the direction of extension of said fastening members, said soft foam padding member embracing the seat surface and the lateral edges of said supporting body like a hood, the edge region of said soft foam padding member enclosing on the underside of the saddle at least the lower edge of the rim of the supporting body, and the center region of said soft foam padding member enclosing the underside of the seat member of the supporting body, the soft foam material covering the center region of said supporting body and extending from the upper surface to the underside of said supporting body through said passage apertures, a cover skin over said soft foam padding member, wherein said padding member consists of an open-pore foam body merging by way of a zone of pores of reduced size into said cover skin.